United States Patent
Lomoelder et al.

(10) Patent No.: US 9,115,293 B2
(45) Date of Patent: Aug. 25, 2015

(54) NON-AQUEOUS ROOM TEMPERATURE-CURING COATING MATERIAL

(71) Applicants: Rainer Lomoelder, Muenster (DE); Andre Raukamp, Marl (DE); Sabine Naumann, Herne (DE)

(72) Inventors: Rainer Lomoelder, Muenster (DE); Andre Raukamp, Marl (DE); Sabine Naumann, Herne (DE)

(73) Assignee: EVONIK DEGUSSA GmbH, Essen (DE)

( * ) Notice: Subject to any disclaimer, the term of this patent is extended or adjusted under 35 U.S.C. 154(b) by 55 days.

(21) Appl. No.: 13/833,591

(22) Filed: Mar. 15, 2013

(65) Prior Publication Data

US 2013/0243962 A1    Sep. 19, 2013

(30) Foreign Application Priority Data

Mar. 19, 2012 (DE) .......................... 10 2012 204 298

(51) Int. Cl.
| | |
|---|---|
| C08G 18/08 | (2006.01) |
| C09D 175/02 | (2006.01) |
| C08G 18/64 | (2006.01) |
| C08G 18/77 | (2006.01) |
| C08G 18/62 | (2006.01) |
| C08G 18/79 | (2006.01) |
| C08G 18/80 | (2006.01) |
| C09D 133/06 | (2006.01) |
| C09D 175/04 | (2006.01) |
| C08G 18/28 | (2006.01) |

(52) U.S. Cl.
CPC ............ *C09D 175/02* (2013.01); *C08G 18/289* (2013.01); *C08G 18/6254* (2013.01); *C08G 18/6469* (2013.01); *C08G 18/778* (2013.01); *C08G 18/792* (2013.01); *C08G 18/809* (2013.01); *C09D 133/066* (2013.01); *C09D 175/04* (2013.01)

(58) Field of Classification Search
CPC ............ C08G 18/298; C08G 18/6469; C08G 18/778; C08G 18/809; C09D 175/02; C09D 175/04
See application file for complete search history.

(56) References Cited

U.S. PATENT DOCUMENTS

| | | |
|---|---|---|
| 5,516,559 A | 5/1996 | Röckrath et al. |
| 6,013,326 A | 1/2000 | Flosbach et al. |
| 2003/0027921 A1 | 2/2003 | Speier et al. |
| 2005/0003206 A1* | 1/2005 | Spyrou et al. .............. 428/423.1 |
| 2005/0096450 A1* | 5/2005 | Spyrou et al. .................. 528/44 |
| 2008/0220173 A1 | 9/2008 | Poppe et al. |
| 2010/0092686 A1 | 4/2010 | Laryea et al. |
| 2010/0297355 A1 | 11/2010 | Cranfill et al. |

FOREIGN PATENT DOCUMENTS

| | | | |
|---|---|---|---|
| DE | 195 29 124 | 11/1996 | |
| DE | 10 2004 050 747 | 4/2006 | |
| EP | 0 140 186 | 5/1985 | |
| EP | 0 549 643 | 7/1993 | |
| EP | 1 273 640 | 1/2003 | |
| EP | 1 624 027 | 2/2006 | |
| WO | WO 92/11327 | 7/1992 | |
| WO | WO 92/11328 | 7/1992 | |
| WO | WO 93/15849 | 8/1993 | |
| WO | WO 2008/131715 | 11/2008 | |
| WO | WO-2011046773 | * 4/2011 | .............. C08K 5/24 |

OTHER PUBLICATIONS

Extended European Search Report Issued Jul. 29, 2013 in Patent Application No. 13158579.6 (with English translation of Categories of Cited Documents).

\* cited by examiner

*Primary Examiner* — Michael L Leonard
(74) *Attorney, Agent, or Firm* — Oblon, McClelland, Maier & Neustadt, L.L.P.

(57) ABSTRACT

Provided is a coating material comprising a crosslinker component and a catalyst component, the coating material curing at temperatures of 10 to 80° C., to the use of the coating materials to coat a variety of substrates and to coating compositions comprising coating material.

20 Claims, No Drawings

NON-AQUEOUS ROOM TEMPERATURE-CURING COATING MATERIAL

BACKGROUND OF THE INVENTION

1. Field of the Invention

The present invention relates to a coating material comprising a crosslinker component and a catalyst component, the coating material curing at temperatures of just 10 to 80° C., to the use of the coating materials and to coating compositions comprising them.

2. Description of the Background

For the permanently protective coating of heat-sensitive substrates it is nowadays common to use two-component paints which are able to cure just at ambient temperature. They consist of film-forming resins having functional groups and of crosslinkers which react just at ambient temperature with these functional groups, with crosslinking taking place. On account of their high reactivity, these crosslinkers frequently possess an intrinsic toxicological hazard potential to humans. There is, therefore, a desire to provide alternative coating systems which possess a comparably broad application spectrum, in conjunction with a high level of resistance on the part of the cured coatings towards effects of chemicals or of weathering, and also towards mechanical exposure. The technical benchmark to be employed is the long-established aliphatic 2K (2-component) PU systems.

One possible alternative is represented by coating systems based on organofunctional silanes, which have proved to be highly performing after heat curing and so are already being used for automotive OEM finishing.

Described in EP-549 643, WO 92/11327, WO 92/11328 and U.S. Pat. No. 5,225,248 is the use of resins containing silane groups in non-aqueous, heat-curing clearcoats for automotive OEM finishing, where, usually, curing temperatures upwards of 120° C. are employed. Since the reactivity profile requirements imposed in automotive finishing are fundamentally different from those in the case of ambient temperature drying, the catalysts specified there, and their concentrations, are unsuitable for curing at below 80° C.

Partially silanized polyisocyanates for scratch-resistant clearcoats are known from EP-A 1273640. They are required to possess free NCO groups in order for curing to take place with sufficient rapidity. Furthermore, the crosslinkers described therein are used in heat-curing coatings for automotive finishing—that is, curing temperatures of more than 120° C. are employed. The claimed use of blocked sulfonic acid catalysts which develop their activity only at above 100° C. is therefore unsuitable for curing at temperatures below 80° C.

Described in the technical literature are a variety of catalysis principles for accelerating the curing of silane-containing reactive systems.

DE 102004050747 A1 discloses catalysts of the Lewis acid type. Used accordingly as catalysts for the crosslinking of the silane functionalities are Lewis acids (electron-deficient compounds), such as tin naphthenate, tin benzoate, tin octoate, tin butyrate, dibutyltin dilaurate, dibutyltin diacetate, dibutyltin oxide, and lead octoate, for example. Catalysts used here are also, preferably, metal complexes with chelate ligands. The compounds which form chelate ligands are organic compounds having at least two functional groups that are able to coordinate to metal atoms or metal ions. These functional groups are usually electron donors which give up electrons to metal atoms or metal ions. On account of their heavy metal character, these catalysts are frequently objectionable toxicologically and more particularly in any case are not sufficiently active to ensure rapid curing at ambient temperature.

Lewis acid types or else sulfonic or phosphoric acid catalysts are the catalysts usually described and utilized in silane technology.

In experiments, however, it has emerged that the catalysts described above are not suitable for ambient temperature curing.

EP 1 624 027 describes combinations of metal carboxylates or organic carboxylic acids and heteroatom-containing silanes for catalysing the curing of dimethoxysilane-based sealants. In that case, however, liquid carboxylic acids which have a low viscosity and a particularly preferred melting point of −40 to +35° C. are claimed and in all of the examples are combined with amines—that is, they are used in neutralized form. The extent to which this principle can be transposed from highly elastic sealants to highly crosslinked coating systems is not disclosed and is not apparent to the skilled person.

U.S. Pat. No. 4,863,520 describes the use of tetralkylammonium carboxylates in sol-gel systems based on reaction products of colloidal silicas, alkyltrialkoxysilanes and water. In this reference, however, tetralkylammonium carboxylates are used for condensing the silanol groups which have formed through the hydrolysis of the silanes. These systems are cured preferably at temperatures above 80° C., preferably above 100° C. Curing at lower temperatures is not disclosed.

SUMMARY OF THE INVENTION

It is an object of the present invention to provide a non-aqueous coating material based on organo-functional silanes that can be cured at temperatures in the range of just 10° C. to 80° C. and that leads in the cured state to coatings having high mechanical resistance, more particularly the scratch resistance.

The objects of the invention may be accomplished with a non-aqueous coating material, comprising:

A) at least one crosslinker component consisting of at least one aliphatic, cycloaliphatic and/or (cyclo)aliphatic diisocyanate or polyisocyanate having an NCO functionality of 2-6, at least 90 mol % of the free isocyanate groups originally present in the diisocyanate or polyisocyanate having undergone reaction with at least one secondary aminosilane of formula I:

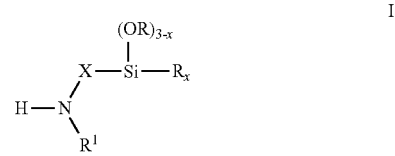

wherein
$R^1$ is

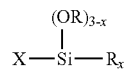

or R, wherein
each R is, independently at each occurrence, an alkyl, cycloalkyl, aryl or aralkyl radical having 1 to 10 carbon atoms, wherein the carbon chain may be interrupted by non-adjacent oxygen atoms, sulfur atoms, or $NR_a$ groups,
each $R_a$ is, independently at each occurrence, an alkyl, cycloalkyl, aryl or aralkyl radical having 1 to 10 carbon atoms,
each X is, independently at each occurrence, a linear or branched and/or cyclic hydrocarbon radical having 1 to 20 carbon atoms, and
x is 0 to 2, B) optionally, one or more binder components,
C) from 0.05 to 5 wt. % of at least one catalyst selected from
C1) at least one organic carboxylic acid having a melting point of at least 60° C. and/or
C2) at least one tetraalkylammonium carboxylate,
D) optionally, one or more auxiliaries and/or adjuvants,
E) optionally, one or more organic solvents.

In one embodiment of the invention, the coating material described above is curable at a temperatures in the range from 10° C. to 80° C.

In one embodiment of the invention, the coating material described above contains 20-99.5 wt. % of A) based on the total weight of the coating material.

In one embodiment of the invention, the coating material described above contains 0.1-80 wt. % of B) based on the total weight of the coating material.

In one embodiment of the invention, the at least one aliphatic and/or cycloaliphatic polyisocyanate is selected from the group consisting of isophorone diisocyanate, hexamethylene diisocyanate, diisocyanatodicyclohexylmethane, 2-methylpentane diisocyanate, 2,2,4-trimethylhexamethylene diisocyanate/2,4,4-trimethylhexamethylene diisocyanate and α,α,α',α'-tetramethyl-meta-xylylene diisocyanate.

In anonther embodiment of the invention, the secondary aminosilane of the general formula I is selected from the group consisting of N,N-bis(3-trimethoxysilylpropyl)amine, N,N-bis(3-triethoxysilylpropyl)amine, N,N-bis(3-triisopropoxysilylpropyl)amine, N-butyl-N-(3-trimethoxysilylpropyl)amine and N-butyl-N-(3-triethoxysilylpropyl)amine.

In an alternative embodiment of the invention, the coating material described above contains B) and wherein B) is a hydroxyl-containing polyester, polyether, polyacrylate, polycarbonate or polyurethane having an OH number of 20 to 500 mg KOH/g and an average molar mass of 250 to 6000 g/mol.

In one embodiment of the invention, the coating material described above contains B) and wherein B) is a trialkoxysilane-functional binder.

In one embodiment of the invention, the coating material described above contains C1) wherein C1) is selected from the group consisting of salicylic acid, benzoic acid, citric acid, phthalic acid, terephthalic acid, isophthalic acid, dodecanoic acid, 1,12-dodecanedioic acid and ascorbic acid.

In one embodiment of the invention, the coating material described above contains C2) wherein C2) is selected from the group consisting of tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate.

In another embodiment of the invention, the coating material described above consists essentially of A), B), C), D) and E).

In another embodiment of the invention, the coating material described above consists of A), B), C), D) and E).

The present invention also provides a method of preparing the coating material described above by combining A), B), C), D) and E).

The present invention also provides a method of coating a substrate comprising applying the coating material described above to a substrate.

In one embodiment of the invention, the substrate is metal, wood, plastic or glass.

The present invention also provides a method of coating a substrate comprising applying the coating material described above to a substrate and then curing the coating material.

In one embodiment of the invention, the coating material is cured at a temperatures in the range from 10° C. to 80° C.

The present invention also provides a coated substrate prepared by curing the curing the coating material described above applied to a substrate.

The present invention also provides a primer, intermediate coat, topcoat or clearcoat comprising the coating material described above.

The present invention also provides a composition suitable for coating metal, wood, plastic or glass comprising the coating material as described above.

A more complete appreciation of the invention and many of the attendant advantages thereof will be readily obtained as the same becomes better understood by reference to the following Figures in conjunction with the detailed description below.

DETAILED DESCRIPTION OF THE INVENTION

The present invention accordingly provides non-aqueous coating materials, which are curable preferably at temperatures of 10° C. to 80° C., comprising
A) at least one crosslinker component consisting of at least one aliphatic, cycloaliphatic and/or (cyclo)aliphatic diisocyanate or polyisocyanate having an NCO functionality of 2-6, at least 90 mol % of the free isocyanate groups originally present in the diisocyanate or polyisocyanate having undergone reaction with at least one secondary aminosilane having the general formula I

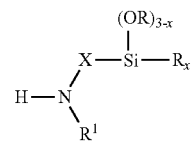

I where
$R^1$ is

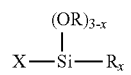

or R, wherein R simultaneously or independently at each occurrence denotes alkyl, cycloalkyl, aryl or aralkyl having not more than 10 carbon atoms, it being possible for the carbon chain to be interrupted by non-adjacent oxygen atoms, sulfur atoms, or NR$_a$ groups with R$_a$=alkyl, cycloalkyl, aryl or aralkyl, having not more than 10 carbon atoms, and Xs simultaneously or independently of one another are linear or branched and/or cyclic hydrocarbon radicals having not more than 20, more particularly 2 to 20, carbon atoms, with x=0 to 2, B) optionally one or more binder components, C) from 0.05 to 5 wt. % of at least one catalyst selected from C1) at least one organic carboxylic acid having a melting point of at least 60° C. and/or C2) at least one tetraalkylammonium carboxylate, D) optionally auxiliaries and/or adjuvants, E) optionally organic solvents.

The range of the curing temperature described above includes all specific values and subranges therebetween, such as 20, 25, 30, 40, 50, 60, 70 and 75° C.

The coating materials of the present invention are non-aqueous systems. Non-aqueous in the sense of the present invention means a water content in the coating material of the invention of not more than 3 wt. %, preferably not more than 1 wt. %, based on the coating material. With more particular preference the coating material of the invention is free from water. Thus, the coating material may have a water content of at most 3, 2, 1, 0.5, 0.25, 0.2, 0.1, 0.05, 0.02 or 0.01 wt % or less.

The inventive achievement of the object of the present invention is surprising insofar as the skilled person could not have expected on the basis of known compositions that the inventive combination of catalyst component and crosslinker component would lead to coating materials which can be cured at the low temperatures discussed above. Instead, on the basis of known compositions, the skilled person is directed to employ such coating materials for higher curing temperatures. A further surprise is that with the coating material of the invention, easy access is enabled to scratch-resistant coatings, which are otherwise difficult to realize.

For the skilled person it is completely surprising that a coating material of the invention exhibits a reactivity and, even after curing under mild conditions, a profile of properties that is the equal of the industry standard, the 2K PU paints.

The crosslinker component A) consists of at least one aliphatic, cycloaliphatic and/or (cyclo)aliphatic diisocyanate or polyisocyanate having an NCO functionality of 2-6, at least 90 mol %, preferably >95 mol %, of the free isocyanate groups originally present in the diisocyanate or polyisocyanate having undergone reaction with at least one secondary aminosilane having the formula I

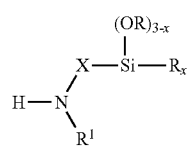

I where
R$^1$ is

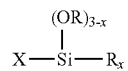

or R,
wherein R simultaneously or independently at each occurrence denotes alkyl, cycloalkyl, aryl or aralkyl having not more than 10 carbon atoms, it being possible for the carbon chain to be interrupted by non-adjacent oxygen atoms, sulfur atoms, or NR$_a$ groups with R$_a$=alkyl, cycloalkyl, aryl or aralkyl, having not more than 10 carbon atoms, and Xs simultaneously or independently of one another are linear or branched and/or cyclic hydrocarbon radicals having not more than 20, more particularly 2 to 20, carbon atoms, with x=0 to 2.

The diisocyanate or polyisocyanate of component A) that is used has an (average) NCO functionality of 2-6, preferably of 2 to 4. This range and the ranges described above include all specific values and subranges therebetween.

The diisocyanates or polyisocyanates used in accordance with the invention may consist of any desired aliphatic, cycloaliphatic and/or (cyclo)aliphatic diisocyanates or polyisocyanates. (Cyclo)aliphatic diisocyanates are understood by the skilled person as cyclically and aliphatically bonded NCO groups simultaneously in one molecule, as is the case, for example, in isophorone diisocyanate. In contrast, cycloaliphatic diisocyanates are understood to be those which have only NCO groups bonded directly on the cycloaliphatic ring, for example diisocyanatodicyclohexylmethane (H$_{12}$MDI).

Suitable aliphatic diisocyanates or polyisocyanates advantageously possess 3 to 16 carbon atoms, preferably 4 to 12 carbon atoms, in the linear or branched alkylene radical. Suitable cycloaliphatic or (cyclo)aliphatic diisocyanates advantageously have 4 to 18 carbon atoms, preferably 6 to 15 carbon atoms, in the cycloalkylene radical. These ranges include all specific values and subranges therebetween.

Examples of suitable diisocyanates or polyisocyanates are cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane diisocyanate and triisocyanate, undecane diisocyanate and triisocyanate, and dodecane diisocyanates and triisocyanates.

The at least one aliphatic, cycloaliphatic and/or (cyclo)aliphatic diisocyanate or polyisocyanate is preferably selected from isophorone diisocyanate (IPDI), hexamethylene diisocyanate (HDI), diisocyanatodicyclohexylmethane (H$_{12}$MDI), 2-methylpentane diisocyanate (MPDI), 2,2,4-trimethylhexamethylene diisocyanate/2,4,4-trimethylhexamethylene diisocyanate (TMDI) and/or α,α,α',α'-tetramethyl-meta-xylylene diisocyanate (TMXDI). Especially preferred is the use of IPDI, HDI, TMDI and/or H$_{12}$MDI, with IPDI, H$_{12}$MDI and/or HDI being especially preferred.

Likewise suitable are 4-methylcyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate and/or 1,4-diisocyanato-4-methylpentane.

In the case of an NCO functionality of greater than two it is preferred to use polyisocyanates, alone or in mixtures, which are prepared, for example, by trimerization, dimerization, urethanization, biuretization or allophanatization and also by blending of the polyisocyanates with monomers. Polyisocyanates of these kinds or polyisocyanate/monomer mixtures may optionally have been branched or additionally chain-extended with difunctional or polyfunctional, H-acidic components, such as diols or polyols and/or diamines or polyamines, for example.

Furthermore, it is preferred to use oligomeric or polymeric diisocyanates or polyisocyanates which are preparable from the aforementioned diisocyanates or polyisocyanates, or mixtures thereof, by linkage by means of urethane, allophanate, urea, biuret, uretdione, amide, isocyanurate, carbodiimide, uretonimine, oxadiazinetrione or iminooxadiazinedione structures. Particularly suitable are isocyanurates, especially of IPDI and/or HDI.

In the context of the present invention it is possible to use any desired mixtures of the afore-described diisocyanates or polyisocyanates.

The modification of the diisocyanates or polyisocyanates used, to give the crosslinker component A), takes place by reaction of diisocyanates or polyisocyanates with secondary aminosilanes having the general formula I:

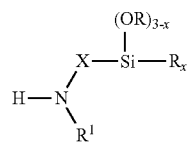

where
R$^1$ is

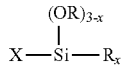

or R,
wherein R simultaneously or independently at each occurrence denotes alkyl, cycloalkyl, aryl or aralkyl having not more than 10 carbon atoms, more particularly 1 to 10 carbon atoms, it being possible for the carbon chain to be interrupted by non-adjacent oxygen atoms, sulfur atoms, or NR$_a$ groups with R$_a$=alkyl, cycloalkyl, aryl or aralkyl, having not more than 10 carbon atoms, more particularly 1 to 10 carbon atoms, and Xs simultaneously or independently of one another are linear or branched and/or cyclic hydrocarbon radicals having not more than 20, more particularly 2 to 20, carbon atoms, with x=0 to 2. These ranges include all specific values and subranges therebetween.

Here, at least 90 mol %, preferably >95 mol %, of the free isocyanate groups originally present in the diisocyanate or polyisocyanate are reacted with the at least one secondary aminosilane having the general formula I. Thus, the amount of free isocyanate groups originally present in the diisocyanate or polyisocyanate which are reacted with the at least one secondary aminosilane having the general formula I may be at least 90, 95, 96, 97, 98, 99 or 99.5 mol %.

Preferred compounds of the general formula I are selected in particular from N,N-bis(3-trimethoxysilylpropyl)amine, N,N-bis(3-triethoxysilylpropyl)amine, N,N-bis(3-triisopropoxysilylpropyl)amine, N-butyl-N-(3-trimethoxysilylpropyl)amine and/or N-butyl-N-(3-triethoxysilylpropyl)amine.

The reaction of the two compounds for preparing the crosslinker component A) takes place in liquid phase, i.e. optionally with accompanying use of aprotic solvents that are customary in PU technology, at temperatures below 130° C., optionally with accompanying use of catalysts and/or stabilizers. The reaction of polyisocyanates with secondary aminosilanes is generally described in EP 1273640.

One preparation variant of the crosslinker component A) lies in the partial reaction of monomeric diisocyanates with the afore-described compounds of the formula I and subsequent conversion to the polyisocyanate by trimerization, dimerization, urethanization, biuretization or allophanatization, with subsequent distillative removal of residual monomers, where necessary. Mixtures of unmodified polyisocyanates and fully reacted polyisocyanates are also in accordance with the invention if in total at least 90 mol %, preferably >95 mol %, of the free isocyanate groups originally present in the diisocyanate or polyisocyanate of the mixture have undergone reaction with the at least one secondary aminosilane having the general formula I.

The fraction of A) in the coating material of the invention is 20 to 99.5 wt. %, based on the coating material, more particularly 30 to 90 wt. %. These ranges include all specific values and subranges therebetween, such as 25, 35, 40, 45, 50, 60, 70, 80, 85, 95, 96, 97, 98 and 99 wt %.

Furthermore, the coating material of the invention may optionally comprise one or more binder components. Fundamentally suitable as binder components are all of the kinds of binders known to the skilled person, including, for example, thermoplastic—i.e. non-crosslinkable—binders, which usually have an average molecular weight >10 000 g/mol. It is preferred, however, to use binders which possess reactive functional groups having acidic hydrogen atoms. Suitable binders of the type stated have for example at least one, but preferably two or more, hydroxyl group(s). Other suitable functional groups in the binder are trialkoxysilane functionalities, for example.

As binders having functional groups it is preferred to use hydroxyl-containing polymers, more particularly hydroxyl-containing polyesters, polyethers, polyacrylates, polycarbonates and polyurethanes having an OH number of 20 to 500 mg KOH/g and an average molar mass of 250 to 6000 g/mol. In the context of the present invention particular preference is given to using hydroxyl-containing polyesters or polyacrylates having an OH number of 20 to 150 mg KOH/g and an average molecular weight of 500 to 6000 g/mol as binder components. These ranges encompass all specific values and subranges therebetween.

The hydroxyl number (OHN) is determined in accordance with DIN 53240-2. In this method, the sample is reacted with acetic anhydride in the presence of 4-dimethylaminopyridine as catalyst, and the hydroxyl groups are acetylated. For each hydroxyl group this produces one molecule of acetic acid, while the subsequent hydrolysis of the excess acetic anhydride yields two molecules of acetic acid. The consumption of acetic acid is determined by titrimetry from the difference between main value and a blank value, which is to be carried out in parallel. The molecular weight is determined by means of gel permeation chromatography (GPC).

Characterization of the samples took place in tetrahydrofuran as eluent in accordance with DIN 55672-1.

Hydroxyl-containing (meth)acrylic copolymers that can be used include resins having a monomer composition of the kind described for example in WO 93/15849 (page 8, line 25 to page 10, line 5), or else in DE 195 29124. In that case the acid number, to be established through proportional use of (meth)acrylic acid as monomer, for the (meth)acrylic copolymer ought to be 0-30, preferably 3-15 mg KOH/g. The number-average molar weight (determined by gel permeation chromatography against a polystyrene standard) for the (meth)acrylic copolymer is preferably 2000-20 000 g/mol; the glass transition temperature is preferably −40° C. to +60° C. The hydroxyl content, to be established by proportional use of hydroxyalkyl (meth)acrylates, in the (meth)acrylic copolymers for use in accordance with the invention is preferably 70-250 mg KOH/g, more preferably 90-190 mg KOH/g. These ranges include all specific values and subranges therebetween.

Polyester polyols suitable in accordance with the invention are resins having a monomer composition comprising dicarboxylic and polycarboxylic acids and diols and polyols, of the kind described, for example, in Stoye/Freitag, Lackharze, C. Hanser Verlag, 1996, page 49 or else in WO 93/15849. Other polyester polyols which can be used include polyadducts of caprolactone with low molecular mass diols and triols, of the kind obtainable, for example, under the designation CAPA® (Perstorp). The arithmetically ascertained number-average molar weight is preferably 500-5000 g/mol, more preferably 800-3000 g/mol; the average functionality is preferably 2.0-4.0, more preferably 2.0-3.5. These ranges include all specific values and subranges therebetween.

In principle, polyols containing urethane groups and ester groups and intended for use in accordance with the invention also include those of the kind described in EP 140 186. Preference is given to using those polyols containing urethane groups and ester groups that are prepared using HDI, IPDI, trimethylhexamethylene diisocyanate (TMDI) or ($H_{12}$-MDI). The number-average molar weight is preferably 500-2000 g/mol; the average functionality is in particular in the range of 2.0-3.5. These ranges include all specific values and subranges therebetween.

Trialkoxysilane-functional binders as well are suitable for use as component B, preferably those having an average molar mass of 500-5000 g/mol, inclusive of all specific values and subranges therebetween. Resins of this kind can be obtained by copolymerizing acrylate monomers or methacrylate monomers with acrylic- or methacrylic-functional alkyltrialkoxysilane derivatives (e.g. Dynasylan® MEMO from Evonik Industries AG), of the kind described in WO 92/11328, for example. An alternative synthesis route lies in the derivatization of hydroxyl-containing polyethers, polyesters, polycarbonate-diols or polyacrylates with isocyanatopropyltrialkoxysilane, as is described in Examples 3 and 4 of WO 2008/131715, for example.

It will be appreciated that mixtures of the afore-described binders can also be used. Preferred binders are hydroxyl-containing polyesters and polyacrylates, alone or in mixtures.

The fraction of B) in the coating material of the invention is in particular 0.1-80 wt. %, based on the coating material, more particularly 0.10 to 60 wt. %. These ranges include all specific values and subranges therebetween, such as 0.2, 0.5, 1, 2, 5, 10, 25, 30, 40, 50, 70 and 75 wt % based on the total weight of the coating material.

The mass ratio of component A) to component B) in the coating material of the invention is preferably 3:7 to 7:3, inclusive of all specific values and subranges therebetween.

Another important constituent of the coating materials of the invention is the at least one catalyst C) selected from at least one organic carboxylic acid having a melting point of at least 60° C. (C1) and/or at least one tetraalkylammonium carboxylate (C2).

Catalyst component C) is present in amounts of 0.05 up to 5 wt. %, preferably 0.1 to 3%, based on the coating material, in the coating material of the invention. These ranges include all specific values and subranges therebetween, such as 0.2, 0.5, 1, 1.5, 2 and 2.5 wt % based on the total weight of the coating material.

The stated amounts are based in total on components C1) and/or C2). Thus, the coating material of the invention may contain C1), C2), or a combination of C1) and C2).

Catalysts C1) employed are organic carboxylic acids having a melting point of at least 60° C.—in other words, compounds which are solid at room temperature. Examples of suitable carboxylic acids are, in particular, salicylic acid, benzoic acid, citric acid, phthalic acid, terephthalic acid, isophthalic acid, dodecanoic acid, 1,12-dodecanedioic acid and/or ascorbic acid. Preference is given to using salicylic acid, citric acid or benzoic acid, and mixtures of the stated carboxylic acids can also be used.

As catalyst C2) a tetraalkylammonium carboxylate is used. Examples thereof are tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate. The stated tetraalkylammonium carboxylates may be added alone or in mixtures. It is preferred to use tetraethylammonium benzoate and/or tetrabutylammonium benzoate.

The catalyst component C) in the coating materials of the invention may consist solely of the aforementioned alternatives C1) or C2), or else any desired mixtures of the catalysts C1) and C2) may be used. The mixing ratios may vary between 95:5 and 5:95 (m/m), inclusive of all specific values and subranges therebetween.

The coating material of the invention may further comprise auxiliaries and/or adjuvants D) that are known within coatings technology, such as stabilizers, including light stabilizers, catalysts, fillers, pigments, flow control agents or rheology assistants, such as sag control agents, for example, microgels or pyrogenic silicon dioxide, in typical concentrations. If necessary, it is also possible, in component D) of the coating materials of the invention, for organic or inorganic colour pigments and/or effect pigments that are usual within coatings technology to be incorporated.

In the case of pigment-free systems, i.e., clearcoat systems, component D) is present preferably in amounts of 0.5 up to 8 wt. %, more particularly 1 to 6%, based on the coating material, in the coating material of the invention. Pigments and fillers may be present at 10-70 wt. %, based on the coating material, in the case of coloured coating systems. These ranges include all specific values and subranges therebetween.

The coating material of the invention may further comprise organic solvents as component E). Examples of suitable solvents are ketones, alcohols, esters or aromatics.

Component E) is present in the coating material of the invention preferably in amounts of 20 up to 70 wt. %, more particularly 30 to 60 wt. %, based on the coating material. The amount is guided by the target application viscosity of the coating material. These ranges include all specific values and subranges therebetween, such as 25, 35, 40, 45, 50, 55 and 65 wt %, based on the total weight of the coating material.

The sum total of all fractions of components A)-E) totals 100 wt. %. The coating materials of the invention preferably consists essentially of or consists of the stated components A) to E).

The coating materials of the invention are produced by mixing the afore-described components. Mixing may take place in mixers known to the skilled person, examples being stirred vessels, dissolvers, bead mills, roll mills, etc., or else continuously by means of static mixers.

The present invention also provides for the use of the non-aqueous coating materials of the invention, which in particular are curable preferably at temperatures of 10° C. to 80° C., comprising
A) at least one crosslinker component consisting of at least one aliphatic, cycloaliphatic and/or (cyclo)aliphatic diisocyanate or polyisocyanate having an NCO functionality of 2-6, at least 90 mol % of the free isocyanate groups originally present in the diisocyanate or polyisocyanate having undergone reaction with at least one secondary aminosilane having the general formula I

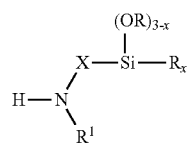

where
$R^1$ is

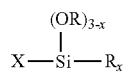

or R,
wherein R simultaneously or independently at each occurrence denotes alkyl, cycloalkyl, aryl or aralkyl having not more than 10 carbon atoms, it being possible for the carbon chain to be interrupted by non-adjacent oxygen atoms, sulfur atoms, or $NR_a$ groups with $R_a$=alkyl, cycloalkyl, aryl or aralkyl, having not more than 10 carbon atoms, and Xs simultaneously or independently of one another are linear or branched and/or cyclic hydrocarbon radicals having not more than 20, more particularly 2 to 20, carbon atoms, with x=0 to 2,
B) optionally one or more binder components,
C) from 0.05 to 5 wt. % of at least one catalyst selected from
C1) at least one organic carboxylic acid having a melting point of at least 60° C. and/or
C2) at least one tetraalkylammonium carboxylate,
D) optionally auxiliaries and/or adjuvants,
E) optionally organic solvents
in primers, intermediate coats, topcoats or clearcoats.

Provided more particularly is the use of the coating materials of the invention in non-aqueous, heat-curing clearcoats for automotive OEM finishing or automotive refinishing.

The present invention likewise provides metal-coating compositions, more particularly for vehicle bodies, motorcycles and pedal cycles, architectural components and household appliances, which comprise the binders of the invention.

Coating compositions for glass coatings, plastics coatings or wood coatings, more particularly clearcoats, comprising the coating materials of the invention are likewise provided by the present invention.

Even in the absence of further details it is assumed that a skilled person is able to utilize the above description to its widest extent. The preferred embodiments and examples are therefore to be interpreted merely as a descriptive disclosure which by no means has any limiting effect whatsoever.

In the following description, the present invention is elucidated further with non-limiting examples. Alternative embodiments of the present invention are obtainable analogously.

EXAMPLES

Having generally described this invention, a further understanding can be obtained by reference to certain specific examples which are provided herein for purposes of illustration only and are not intended to be limiting unless otherwise specified.

Unless otherwise indicated, the amounts in percent in the examples are by weight.
Preparation of Component A):
Silane-Modified Resin 1:
28.8% of VESTANAT® HT 2500/100 (HDI trimer, solvent-free, Evonik Industries AG) are dissolved in 20.0% of Solvesso® 100 and heated to 60° C. under $N_2$. The heating bath is removed and 51.2% of Dynasylan® 1124 (bis(3-trimethoxysilylpropyl)amine, Evonik Industries AG) are added dropwise with stirring at a rate such that the internal temperature does not exceed 55-65° C. After the end of the addition, stirring is continued at 60° C. for an hour and the NCO content is measured.
The NCO content is <0.1%.
The viscosity, measured at 23° C., is 2350 mPas.
The solids content is 80%.
Silane-Modified Resin 2:
31.2% of VESTANAT® T 1890/100 (IPDI trimer, solvent-free, Evonik Industries AG) are dissolved in 25.0% of Solvesso® 100 and heated to 60° C. under $N_2$. The heating bath is removed and 43.8% of Dynasylan® 1124 (bis(3-trimethoxysilylpropyl)amine, Evonik Industries AG) are added dropwise with stirring at a rate such that the internal temperature does not exceed 55-65° C. After the end of the addition, stirring is continued at 60° C. for an hour and the NCO content is measured.
The NCO content is <0.1%.
The viscosity, measured at 23° C., is 6200 mPas.
The solids content is 75%.

Example

Inventive coating material I-VI, Comparative Examples VII, VIII

The clearcoats were formulated in accordance with the proportions indicated in Table 1.
The following materials were used:
Setalux® 1767 VV-65: Polyacrylate polyol, Nuplex Resins B.V., solids content 65% in Solvent Naphtha
Solvesso® 100: Aromatic solvent, ExxonMobil-Chemicals
Byk® 301: Polyether-modified polydimethylsiloxane, flow control agent, Byk Chemie, D
Byketol® Special: Flow control agent based on high-boiling solvents, and also polyether-modified polydimethylsiloxane, Byk Chemie, Wesel, D.

Determined as the flow time in a DIN 4 cup at 23° C., the viscosity of the formulations was approximately 20 seconds.

Comparative Example IX

2K PU Coating Material (Performance Comparative, Not Inventive)

| Formulation: | Setalux ® 1767 W-65 | 52.20% |
| --- | --- | --- |
| Formulation: | VESTANAT ® HT 2500 L | 19.60% |
| Formulation: | Butyl acetate | 12.50% |
| Formulation: | Xylene | 12.50% |
| Formulation: | Byketol ® Special | 3.00% |
| Formulation: | Byk ® 301 | 0.20% |

All of the coating materials were applied by compressed air-assisted spray application using an HVLP gun (from Sota, Kornwestheim, D) to phosphatized steel panels (Gardobond® 26S 60 OC, manufacturer: Chemetall, D)) and cured at room temperature.

The results in Table 2 show that carboxylic acids having a melting point of below 60° C., such as 2-ethylhexanoic acid or neodecanoic acid, lack sufficient catalytic activity for curing the coating materials described in Table 1, based on the binders of the invention from Examples 1 and 2. Carboxylic acids of the invention from Examples I, III, IV, V or tetraethylammonium benzoate (TEAB) and tetrabutylammonium acetate (TBAAc) lead to activity in terms of gel time and development of hardness of the coatings, of the kind achievable with 2K PU systems (comparative example in Table 2).

Obviously, numerous modifications and variations of the present invention are possible in light of the above teachings. It is therefore to be understood that within the scope of the appended claims, the invention may be practiced otherwise than as specifically described herein.

This application is claims benefit of German Patent Application No. DE 10 2012 204 298.9, filed on Mar. 19, 2012, and incorporated herein by reference.

TABLE 1

Composition of the inventive coating materials I-VI and of the non-inventive coating materials VII, VIII

| | Melting point (° C.) | I | II | III | IV | V | VI | VII | VIII |
| --- | --- | --- | --- | --- | --- | --- | --- | --- | --- |
| Setalux ® 1767 VV-65 | | 35.63% | 35.77% | 35.47% | 35.44% | 35.59% | 35.75% | 35.47% | 35.47% |
| Silane-modified resin from Example 1 | | 20.27% | 20.35% | 20.18% | 20.16% | 20.25% | 20.34% | 20.18% | 20.18% |
| Silane-modified resin from Example 2 | | 9.26% | 9.30% | 9.22% | 9.22% | 9.25% | 9.29% | 9.22% | 9.22% |
| Solvesso ® 100 | | 31.28% | 31.41% | 31.11% | 31.12% | 29.50% | 31.40% | 31.11% | 31.11% |
| Ethanol (solvent for catalyst) | | — | — | — | 0.48% | 1.96% | — | — | — |
| Byk ® 301 | | 0.10% | 0.10% | 0.10% | 0.10% | 0.10% | 0.10% | 0.10% | 0.10% |
| Byketol ® Special | | 3.00% | 3.00% | 3.00% | 3.00% | 3.00% | 3.00% | 3.00% | 3.00% |
| Salicylic acid | 158.3 | 0.46% | — | — | — | — | — | — | — |
| Tetraethylammonium benzoate (TEAB) | | — | 0.07% | — | — | — | — | — | — |
| Benzoic acid | 122 | — | — | 0.92% | — | — | — | — | — |
| Citric acid | 153 | — | — | — | 0.48% | — | — | — | — |
| Phthalic acid | 191 | — | — | — | — | 0.35% | — | — | — |
| Tetrabutylammonium acetate | | — | — | — | — | — | 0.12% | — | — |
| Neodecanoic acid (comparative) | −39 | — | — | — | — | — | — | 0.92% | — |
| 2-Ethylhexanoic acid (2-EHA) (comparative) | −59 | — | — | — | — | — | — | — | 0.92% |

TABLE 2

Development of hardness in the applied clearcoats

| Catalyst | I Salicylic acid | II TEAB | III Benzoic acid | IV Citric acid | V Phthalic acid | VI TBAAc | VII (Comparative) Neo-decanoic acid | VIII (Comparative) 2-EHA | IX PU |
| --- | --- | --- | --- | --- | --- | --- | --- | --- | --- |
| Pendulum hardness [s] DIN EN ISO 1522 (König) after 1d RT | 63 | 17 | 37 | 14 | 28 | 8 | tacky | tacky | 39 |
| Pendulum hardness [s] DIN EN ISO 1522 (König) after 7d RT | 92 | 81 | 99 | 104 | 103 | 76 | tacky | tacky | 118 |

TEAB: Tetraethylammonium benzoate
TBAAc: Tetrabutylammonium acetate

The invention claimed is:

1. A non-aqueous coating material, comprising:
    A) at least one crosslinker component consisting of at least one aliphatic, cycloaliphatic and/or (cyclo)aliphatic diisocyanate or polyisocyanate having an NCO functionality of 2-6, at least 90 mol % of the free isocyanate groups originally present in the diisocyanate or polyisocyanate having undergone reaction with at least one secondary aminosilane of formula I:

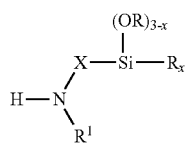

wherein
    $R^1$ is

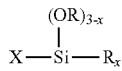

or R,
    wherein
        each R is, independently at each occurrence, an alkyl, cycloalkyl, aryl or aralkyl radical having 1 to 10 carbon atoms, wherein the carbon chain may be interrupted by non-adjacent oxygen atoms, sulfur atoms, or $NR_a$ groups,
        each $R_x$ is, independently at each occurrence, an alkyl, cycloalkyl, aryl or aralkyl radical having 1 to 10 carbon atoms,
        each X is, independently at each occurrence, a linear or branched and/or cyclic hydrocarbon radical having 1 to 20 carbon atoms, and
        x is 0 to 2,
    B) optionally, one or more binder components,
    C) a catalyst consisting of from 0.05 to 5 wt. % of at least one organic carboxylic acid having a melting point of at least 60° C.,
    D) optionally, one or more auxiliaries and/or adjuvants,
    E) optionally, one or more organic solvents.

2. The coating material of claim 1, which is curable at a temperatures in the range from 10° C. to 80° C.

3. The coating material of claim 1, which contains 20-99.5 wt. % of A) based on the total weight of the coating material.

4. The coating material of claim 1, which contains 0.1-80 wt. % of B) based on the total weight of the coating material.

5. The coating material of claim 1, wherein the at least one aliphatic and/or cycloaliphatic polyisocyanate is selected from the group consisting of isophorone diisocyanate, hexamethylene diisocyanate, diisocyanatodicyclohexylmethane, 2-methylpentane diisocyanate, 2,2,4-trimethylhexamethylene diisocyanate/2,4,4-trimethylhexamethylene diisocyanate and α,α,α',α'-tetramethyl-meta-xylylene diisocyanate.

6. The coating material of claim 1, wherein the secondary aminosilane of the general formula I is selected from the group consisting of N,N-bis(3-trimethoxysilylpropyl)amine, N,N-bis(3-triethoxysilylpropyl)amine, N,N-bis(3-triisopropoxysilylpropyl)amine, N-butyl-N-(3-trimethoxysilylpropyl)amine and N-butyl-N-(3-triethoxysilylpropyl)amine.

7. The coating material of claim 1, which contains B) and wherein B) is a hydroxyl-containing polyester, polyether, polyacrylate, polycarbonate or polyurethane having an OH number of 20 to 500 mg KOH/g and an average molar mass of 250 to 6000 g/mol.

8. The coating material of claim 1, which contains B) and wherein B) is a trialkoxysilane-functional binder.

9. The coating material of claim 1, wherein the organic carboxylic acid is selected from the group consisting of salicylic acid, benzoic acid, citric acid, phthalic acid, terephthalic acid, isophthalic acid, dodecanoic acid, 1,12-dodecanedioic acid and ascorbic acid.

10. The coating material of claim 1, which further comprises at least one member selected from the group consisting of tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate.

11. The coating material of claim 1, which consists essentially of A), B), C), D) and E).

12. The coating material of claim 1, which consists of A), B), C), D) and E).

13. A method of preparing the coating material of claim 1, comprising combining A), B), C), D) and E).

14. A method of coating a substrate comprising applying the coating material of claim 1 to a substrate.

15. The method of claim 14, wherein the substrate is metal, wood, plastic or glass.

16. A method of coating a substrate comprising applying the coating material of claim 1 to a substrate and then curing the coating material.

17. The method of claim 16, wherein the coating material is cured at a temperatures in the range from 10° C. to 80° C.

18. A coated substrate prepared by curing the curing the coating material of claim 1 applied to a substrate.

19. A primer, intermediate coat, topcoat or clearcoat comprising the coating material of claim 1.

20. A composition suitable for coating metal, wood, plastic or glass comprising the coating material of claim 1.

* * * * *